(12) United States Patent
Su et al.

(10) Patent No.: US 7,928,943 B2
(45) Date of Patent: Apr. 19, 2011

(54) LIQUID CRYSTAL DISPLAY

(75) Inventors: Jenn-Jia Su, Hsinchu (TW); Wen-Hao Hsu, Hsinchu (TW); Ting-Wei Su, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 735 days.

(21) Appl. No.: 11/951,330

(22) Filed: Dec. 6, 2007

(65) Prior Publication Data

US 2008/0198282 A1 Aug. 21, 2008

(30) Foreign Application Priority Data

Feb. 16, 2007 (TW) ................................ 96106390 A

(51) Int. Cl.
*G09G 3/36* (2006.01)
(52) U.S. Cl. ................................ 345/87; 345/90; 345/98
(58) Field of Classification Search .................... 345/87, 345/90, 98
See application file for complete search history.

(56) References Cited

U.S. PATENT DOCUMENTS

2003/0146893 A1 8/2003 Sawabe
2003/0227429 A1* 12/2003 Shimoshikiryo ............... 345/90

* cited by examiner

*Primary Examiner* — Amr Awad
*Assistant Examiner* — Jonathan Boyd
(74) *Attorney, Agent, or Firm* — Jianq Chyun IP Office

(57) ABSTRACT

A liquid crystal display (LCD) including an LCD panel, a gate driver and a data driver is provided. The LCD panel has pixel units, scan lines and several pairs of data lines. Each of the pixel units is electrically connected to a corresponding scan line and a corresponding pair of data lines and has two display regions respectively connected to different data lines. Besides, the gate driver is electrically connected to several scan lines. The data driver is electrically connected to several pairs of data lines. The data driver has a voltage difference generator electrically connected to several pairs of data lines such that the voltages outputted by the pair of data lines are maintained at a fixed voltage difference. Thus, the invention simplifies the complexity of circuit signal processing and lowers the production cost of circuits.

4 Claims, 6 Drawing Sheets

LIQUID CRYSTAL DISPLAY

CROSS-REFERENCE TO RELATED APPLICATION

This application claims the priority benefit of Taiwan application serial no. 96106390, filed on Feb. 16, 2007. The entirety of the above-mentioned patent application is hereby incorporated by reference herein and made a part of this specification.

BACKGROUND OF THE INVENTION

1. Field of the Invention

The present invention relates to a display device, and more particularly, to a liquid crystal display (LCD).

2. Description of Related Art

Nowadays, the qualities the market demands from the thin film transistor liquid crystal display (TFT-LCD) are high contrast ratio, no gray scale inversion, low color shift, high luminance, full color, high color saturation, high responsive speed, wide viewing angle and the like. Currently, the technologies that meet the requirement of wide viewing angle include, for example, the twisted nematic (TN) LCD along with the wide viewing film, the in-plane switching (IPS) LCD, the fringe field switching LCD and a multi-domain vertically aligned (MVA) TFT-LCD.

Taking the conventional MVA-LCD panel as an example, since the alignment protrusions or slits formed on the color filter substrate or the TFT array substrate render the liquid crystal molecules arranged in multi-direction thereby obtaining a plurality of different aligned domains and thus meeting the requirement of wide viewing angle.

FIG. 1 is a diagram illustrating the relationship between the normalized transmittance and the gray level of a conventional MVA-LCD. Referring to FIG. 1, the abscissa is the gray level and the ordinate is the normalized transmittance. It is noted from FIG. 1 that although the conventional MVA-LCD panel can meet the requirement of the wide viewing angle, the transmittance-level curve has different curvatures as the viewing angle varies. In other words, when the viewing angle varies, the luminance displayed by the MVA-LCD changes, which in turn results in problems of color shift and color washout.

In order to solve the problem of color shift, several solutions have already been proposed one after the other. One of the solutions is adding one data line in a single pixel unit and disposing two pixel electrodes in the single pixel unit. Different data voltages are written to each of the pixel electrodes through different data lines in the single pixel unit. As a result, the two pixel electrodes of the single pixel unit provide different electrical fields and produce different arrangements of liquid crystal molecules so as to reduce the color shift. Although this solution mitigates the problem of color shift, however, the increased number of required data lines complicates the design of the driving circuit.

FIG. 2 is a schematic diagram of a conventional LCD. Referring to FIG. 2, an LCD 100 includes a driving signal generator 110, a look-up table (LUT) 120, a gate driver 130, a data driver 140, a drive voltage generator 150 and an LCD panel 160. As shown in FIG. 2, the driving signal generator 110 converts image data from the system into signals required by the data driver 140 and the gate driver 130. The look-up table (LUT) 120 is used for the image conversion process. The data driver 140 receives a data signal from the driving signal generator 110, generates a data voltage based on the driving voltage generator 150, and then inputs the display signal to the LCD panel 160. When the number of data lines doubles, the numbers of the data driver 140 and the look-up table 120 also double. The required capacity of the memory for the driver increases, which results in an increase in the production cost. Meanwhile, in the processing and transmission of signals, since the number of data lines increases, the driving signal generator 110 also needs to increase the number of signal lines and the bandwidth when outputting signals. Consequently, the driving circuit of the LCD 100 is rendered more and more complicated and prevents the production cost of the LCD 100 from being significantly lowered.

SUMMARY OF THE INVENTION

Accordingly, the present invention provides an LCD having a simple driving circuit.

As embodied and broadly described herein, the invention provides an LCD including an LCD panel, a gate driver and a data driver. The LCD panel has a plurality of pixel units, a plurality of scan lines and a plurality of pairs of data lines. Each of the pixel units is electrically connected to one of the scan lines and a pair of the data lines correspondingly. Each of the pixel units has two display regions electrically connected to different data lines respectively. Additionally, the gate driver is electrically connected to a plurality of scan lines. The data driver is electrically connected to the plurality of pairs of data lines. The data driver has a voltage difference generator electrically connected to the plurality of pairs of data lines such that the voltages outputted by the two data lines of each of the pairs are maintained at a fixed voltage difference.

In one embodiment of the invention, the pixel unit may be a transflective pixel unit. For example, each of the transflective pixel units has a transparent region and a reflective region and each of the transflective pixel units includes a transparent electrode disposed in the transparent region, a reflective electrode disposed in the reflective region, a first active device and a second active device. The transparent electrode is electrically connected to the first active device and the reflective electrode is electrically connected to the second active device.

In one embodiment of the invention, the voltage difference generator includes a voltage-rising loop, a voltage-lowering loop and a switch, wherein the voltage-lowering loop and the voltage-rising loop are connected in parallel. The switch is electrically connected to one of each pair of data lines and the switch switches between the voltage-rising loop and the voltage-lowering loop. Specifically, when a first voltage is inputted to the voltage difference generator, a second voltage of higher voltage level is generated through the voltage-rising loop or a second voltage of lower voltage level is generated through the voltage-lowering loop. Afterwards, the second voltage of higher voltage level or of lower voltage level is transmitted to the second data line through the switch. Therefore, each pair of data lines includes a first data line for transmitting a first voltage and a second data line for transmitting a second voltage generated by a voltage-rising loop or a voltage-lowering loop.

In one embodiment of the invention, the LCD further includes a polarity controller electrically connected to the voltage difference generator. The polarity controller controls the switch to switch between the voltage-rising loop and the voltage-lowering loop.

In view of the above, the LCD of the invention uses the voltage difference generator and generates the corresponding second voltage according to the first voltage inputted by the data driver. The first voltage and the second voltage are respectively transmitted to the two display regions of the single pixel unit through the first data line and the second data line. As a result, the two display regions of each of the pixel units in the display panel can display different luminance so as to mitigate the problem of color shift. Since the invention does not require the look-up table to convert image data, which doubles the data volume and transmission bandwidth, the invention reduces the complexity of the driving circuit and lowers the production cost.

In order to make the aforementioned and other objects, features and advantages of the present invention more comprehensible, preferred embodiments accompanied with figures are described in detail below.

DESCRIPTION OF EMBODIMENTS

Figure 3A:
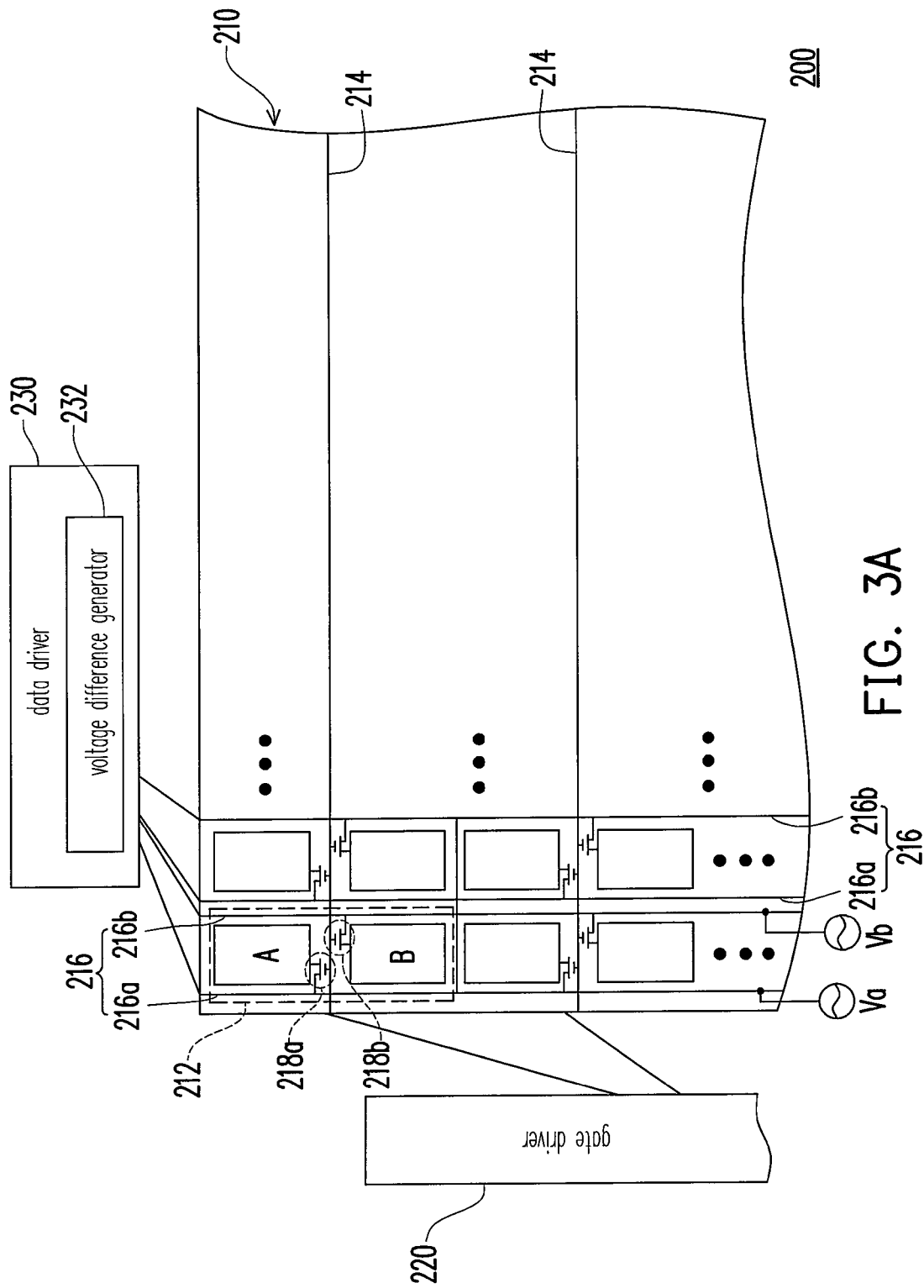
FIG. 3A is a schematic diagram showing an MVA-LCD of the invention.

FIG. 3A is a schematic diagram of a liquid crystal display (LCD) of the present invention. The LCD 200 is a multi-domain vertically aligned (MVA) LCD. The LCD 200 includes an LCD panel 210, a gate driver 220 and a data driver 230. The LCD panel 210 has a plurality of pixel units 212, a plurality of scan lines 214 and a plurality of pairs of data lines 216. Each of the pixel units 212 is electrically connected to one of the scan lines 214 and a pair of data lines 216 correspondingly. Each of the pixel units 212 has two display regions A and B respectively controlled by a first active device 218a and a second active device 218b and respectively receives a first voltage Va and a second voltage Vb transmitted by a first data line 216a and a second data line 216b. Moreover, the gate driver 220 is electrically connected to the scan lines 214. The data driver 230 is electrically connected to the data lines 216. The data driver 230 has a voltage difference generator 232 electrically connected to the data lines 216 so that the voltages respectively outputted by the two data lines 216a and 216b of each pair of data lines 216 are maintained at a fixed voltage difference ΔV. In detail, when the voltage transmitted by the first data line 216a is the first voltage Va, the voltage transmitted by the second data line 216b is the second voltage Vb and a switch 260 (shown in FIG. 4) is switched to connect with a voltage-rising loop 240 (shown in FIG. 4), the second voltage Vb is a voltage level generated by the voltage-rising loop 240 after the first voltage is inputted to the voltage difference generator 232 and is higher than the first voltage Va. If the switch 260 is switched to connect with a voltage-lowering loop 250 (shown in FIG. 4), the second voltage Vb is a voltage level generated by the voltage-lowering loop 250 after the first voltage Va is inputted thereto and is lower than the first voltage Va. Since the two display regions A and B have different voltage levels, the liquid crystal molecules of the two display regions A and B are affected by different electrical fields. As a result, the liquid crystal molecules are arranged differently and thus solve the problem of color shift.

Figure 1:
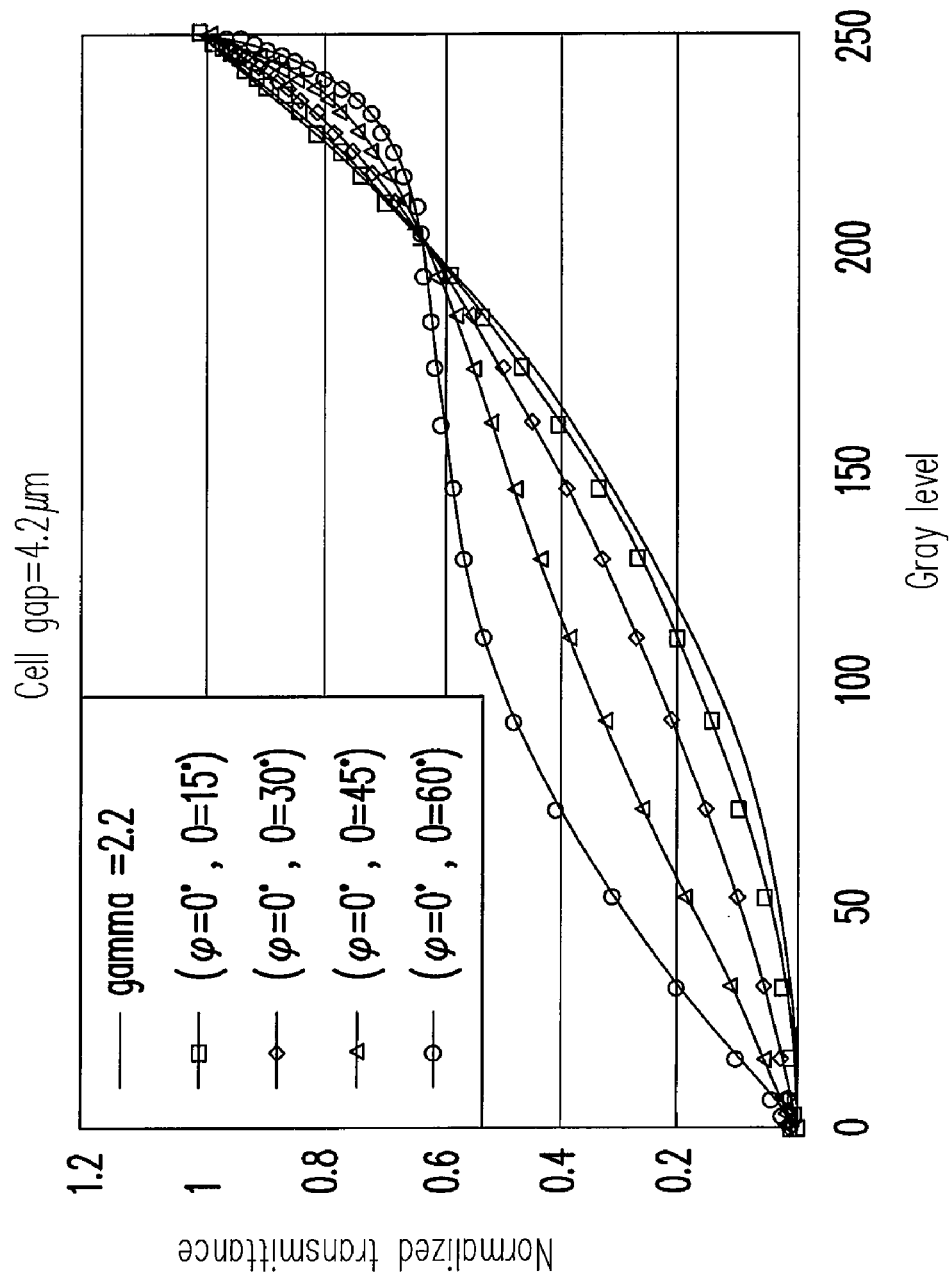
FIG. 1 is a diagram showing the relationship between the normalized transmittance and the gray level of a conventional multi-domain vertically aligned liquid crystal display (MVA-LCD) panel.
Figure 2:
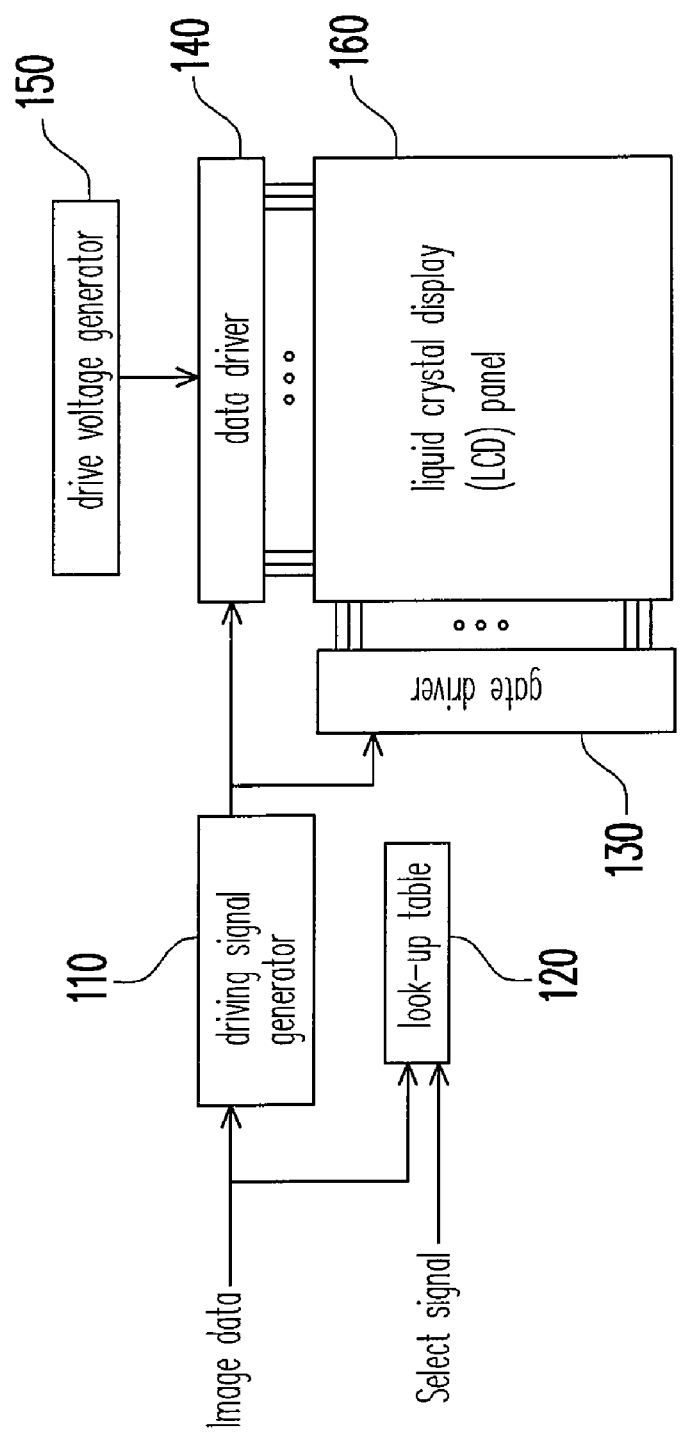
FIG. 2 is a schematic diagram of a conventional LCD.

In one embodiment, a voltage difference ΔV of the voltage difference generator 232 is designated according to actual design requirements so that the voltage difference generator 232 can generate an appropriate second voltage Vb based on the first voltage Va transmitted by the first data line 216a and output the second voltage Vb to the second data line 216b. In view of the above, the present invention does not require the look-up table 120 (as shown in FIG. 2) and only the voltage difference generator 232 is needed to render the voltages transmitted by the data lines 216a and 216b different from each other. Hence, the invention not only substantially lowers the production cost of the LCD 200 but also reduces the complexity of the data driver 230 in the LCD 200.

In addition to the multi-domain vertically aligned LCD, the design of the data driver 230 of the invention may also be applied to the transflective LCD or other similar LCDs.

Figure 3B:
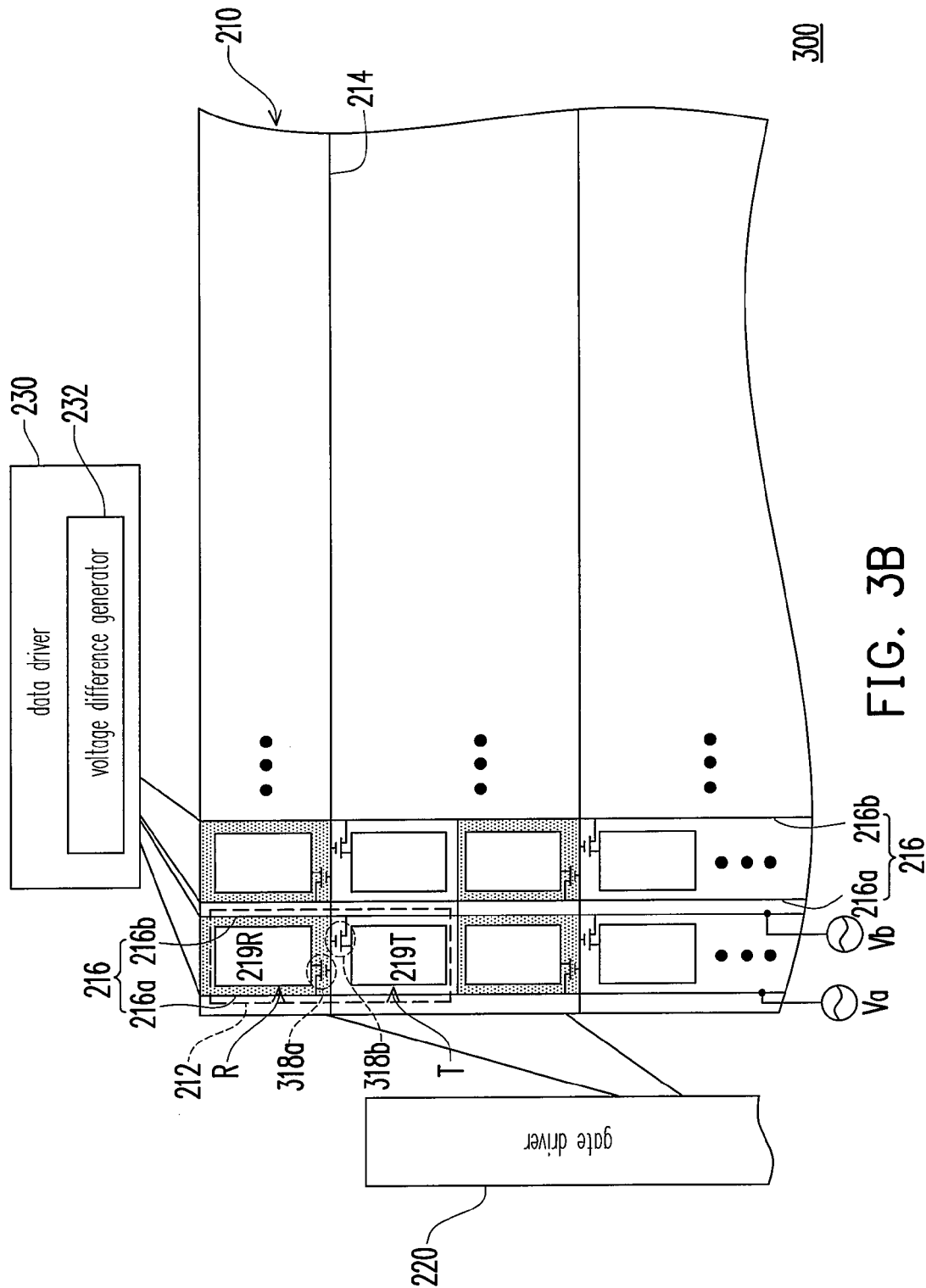
FIG. 3B is a schematic diagram of a transflective LCD of the invention.

FIG. 3B is a schematic diagram of a transflective LCD 300. Referring to FIG. 3B, each of the pixel units 212 has a transparent region T and a reflective region R. Each of the pixel units 212 includes a transparent electrode 219T disposed in the transparent region T, a reflective electrode 219R disposed in the reflective region R, a first active device 318a and a second active device 318b. The reflective electrode 219R and the transparent electrode 219T are respectively controlled by the first active device 318a and the second active device 318b, and respectively receive the first voltage Va and the second voltage Vb transmitted from the first data line 216a and the second data line 216b.

The data driver 230 of the invention is applied in the transflective LCD of FIG. 3B. Since the first voltage Va and the second voltage Vb inputted to the reflective electrode 219R and the transparent electrode 219T differ from each other, the liquid crystal molecules in the reflective region R and the transparent region T are affected by different electrical fields. Consequently, the liquid crystal molecules are arranged differently thereby improving the display quality of the pixel unit 212.

Figure 4:
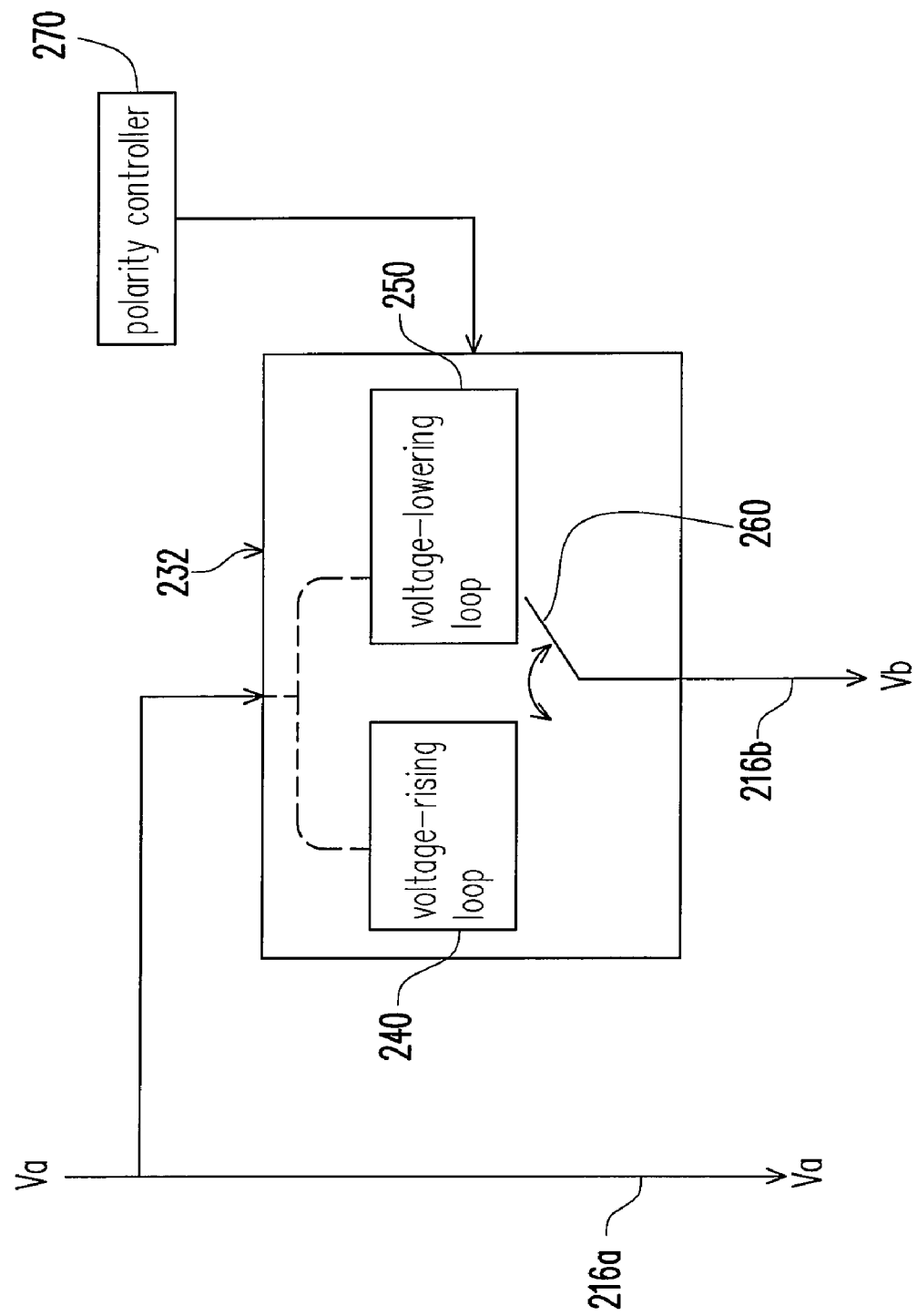
FIG. 4 is a circuit diagram of a voltage difference generator of the invention.

FIG. 4 is a circuit diagram of a voltage difference generator of the invention. In one preferred embodiment of the invention, the voltage difference generator 232 includes a voltage-rising loop 240, a voltage-lowering loop 250 and a switch 260. The voltage-lowering loop 250 and the voltage-rising loop 240 are connected in parallel. The switch 260 is electrically connected to the second data line 216b, and the switch 260 switches between the voltage-rising loop 240 and the voltage-lowering loop 250.

Referring to FIG. 4, each pair of data lines 216 includes a first data line 216a and a second data line 216b. The first data line 216a is used to transmit a first voltage Va and the second data line 216b is used to transmit a second voltage Vb. When the switch 260 is switched to connect with the voltage-rising loop 240, the second voltage Vb is a voltage level generated by the voltage-rising loop 240 and is higher than the first voltage Va after the first voltage Va is inputted to the voltage difference generator 232. Besides, when the switch 260 is switched to connect with the voltage-lowering loop 250, the second voltage Vb is a voltage level lower than the first voltage Va generated by inputting the first voltage Va to the voltage-lowering loop 250. The voltage difference between the second voltage Vb and the first voltage Va is ΔV. It is noted that the absolute values of the designated voltage differences ΔV of the voltage-rising loop 240 and the voltage-lowering loop 250 may be equal to each other. However, in other embodiments, the absolute values of the designated voltage differences ΔV of the voltage-rising loop 240 and the voltage-lowering loop 250 may also not be equal. According to the aforementioned, the voltage difference generator 232 may generate a second voltage Vb based on a first voltage Va to be transmitted to the first data line 216a and the second voltage Vb is transmitted to the second data line 216b through the switch 260. Application of the present invention can simplify the design of the driving circuit and reduce the complicated data calculation done by the data driver 230. Particularly with the demands for large-sized displays growing rapidly and the trend in pursuit of high resolution nowadays, the invention can significantly reduce the complexity of the driving circuit and lower the production cost.

In practice, no matter the driving method is a dot inversion, a row inversion, a column inversion or a frame inversion, the voltage inputted to each of the pixel units 212 of the LCD 200 through the data line 216 switches the polarity frame by frame. In order to prevent the LCD 200 from having the flickering effect during displaying, the LCD 200 of the present embodiment further includes a polarity controller 270 to control in different polarities whether the voltage level of the second voltage Vb is generated by the voltage-rising loop 240 or the voltage-lowering loop 250. In detail, the polarity controller 270 is electrically connected to the voltage difference generator 232. The polarity controller 270 controls the switch 260 so that the switch 260 switches between the voltage-rising loop 240 and the voltage-lowering loop 250 according to the different polarities of the pixel units 212. For example, if the pixel unit 212 is of the positive polarity, the polarity controller 270 controls the switch 260 to switch to the voltage-rising loop 240, and a second voltage Vb higher than the first voltage Va is transmitted to the second data line 216b through the switch 260. If the pixel unit 212 is of the negative polarity, the polarity controller 270 controls the switch 260 to switch to the voltage-lowering loop 250, and a second voltage Vb lower than the first voltage Va is transmitted to the second data line 216b through the switch 260.

Figure 5:
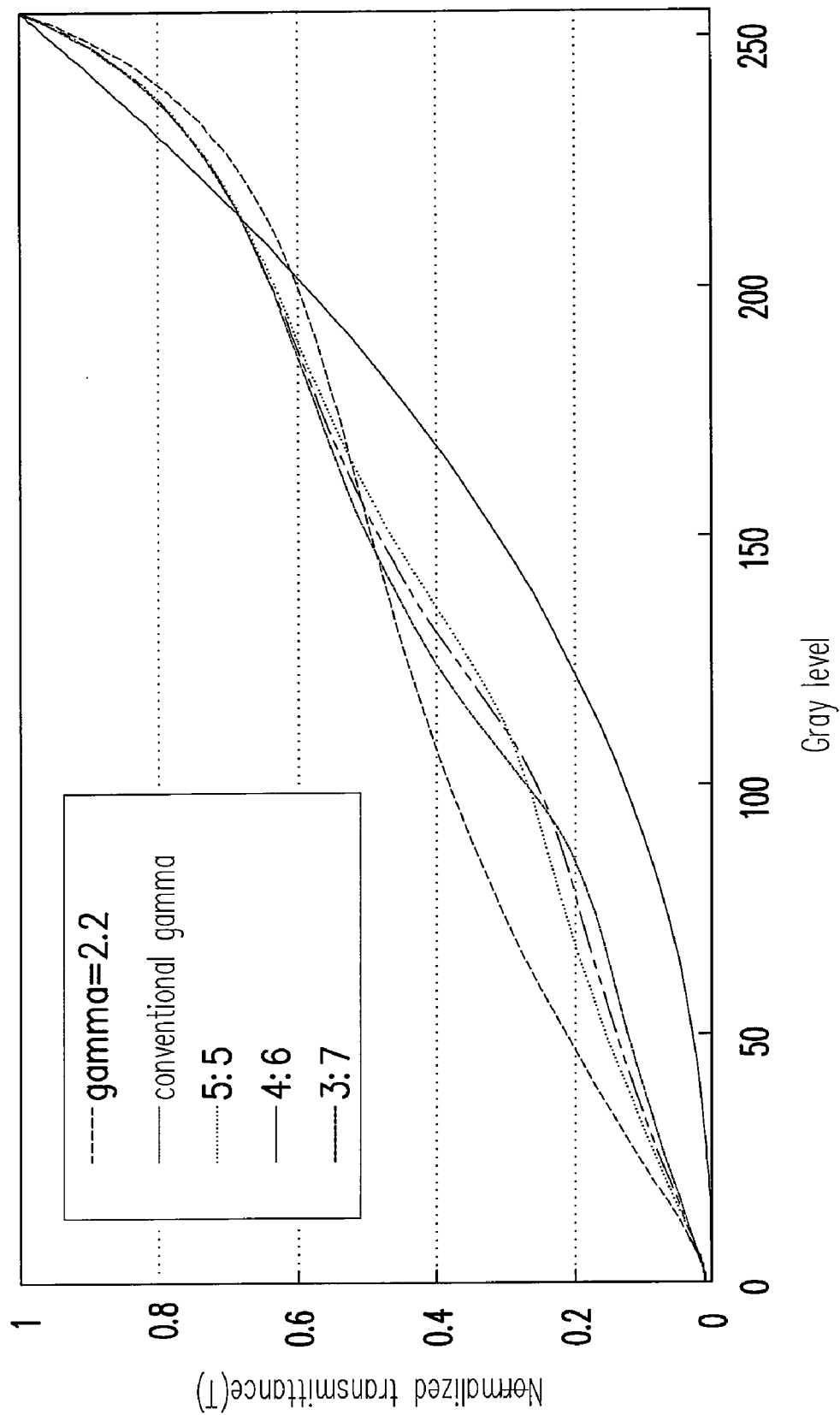
FIG. 5 shows the result of an optical simulation according the invention.

FIG. 5 is the result of an optical simulation implemented according to the abovementioned embodiments. The voltage difference ΔV is, for example, 1 volt, and the pixel units are designed as multi-domain vertically aligned. Different area ratios of a pixel region A and a pixel region B, such as 5:5, 4:6 and 3:7, are shown in the figure respectively. It can be observed from the figure that compared with the conventional gamma curve of the large viewing angle, application of the present invention can obtain a normalized transmittance closer to a curve of the ideal value (gamma=2.2). The invention actually achieves a better lateral viewing effect, mitigates the problem of color shift, and further optimizes the display quality by adjusting the area ratio and the voltage difference.

In summary, the invention uses the voltage difference generator to mitigate the problem of color shift and also simplify the conversion procedure in which a calculating circuit performs gray level displaying (such as omitting the look-up table) thereby substantially reducing the complexity of the driving signal generator in the LCD. Additionally, the invention also reduces the amount of data which driving signal generator provides to the data driver. Not only is the complexity of the circuit reduced so as to increase the effect of transmission and the production cost lowered, the invention can also be applied in display devices with high scanning frequencies (such as 120 Hz) to improve the display quality of the images.

Although the present invention has been disclosed above by the embodiments, they are not intended to limit the present invention. Anybody ordinarily skilled in the art can make some modifications and alterations without departing from the spirit and scope of the present invention. Therefore, the protecting range of the present invention falls in the appended claims.

What is claimed is:

1. A liquid crystal display (LCD), comprising:
    a liquid crystal display panel having a plurality of pixel units, a plurality of scan lines and a plurality of pairs of data lines, wherein each of the pixel units is electrically connected to one of the scan lines and a pair of the data lines correspondingly and each of the pixel units has two display regions electrically connected to different data lines respectively;
    a gate driver electrically connected to the scan lines; and
    a data driver electrically connected to the pairs of data lines, wherein the data driver has a voltage difference generator electrically connected to the pairs of data lines so that the voltages outputted by the two data lines of each pair are maintained at a fixed voltage difference, and the voltage difference generator comprises:
    a voltage-rising loop;
    a voltage-lowering loop, wherein the voltage-lowering loop and the voltage-rising loop are connected in parallel; and
    a switch electrically connected to one of each pair of data lines, wherein the switch switches between the voltage-rising loop and the voltage-lowering loop.

2. The LCD as claimed in claim 1, wherein the pixel units are transflective pixel units.

3. The LCD as claimed in claim 1, wherein each pair of data lines comprises a first data line and a second data line, wherein the first data line transmits a first voltage and the second data line is electrically connected to the switch and transmits a second voltage outputted by the voltage-rising loop or the voltage-lowering loop.

4. The LCD as claimed in claim 1, further comprising a polarity controller electrically connected to the voltage difference generator, wherein the polarity controller controls the switch so that the switch switches between the voltage-rising loop and the voltage-lowering loop.

* * * * *